United States Patent
Currivan et al.

(10) Patent No.: US 7,697,024 B2
(45) Date of Patent: Apr. 13, 2010

(54) METHOD AND SYSTEM OF TRACKING AND STABILIZING AN IMAGE TRANSMITTED USING VIDEO TELEPHONY

(75) Inventors: Bruce J. Currivan, Dove Canyon, CA (US); Xuemin Chen, San Diego, CA (US)

(73) Assignee: Broadcom Corp., Irvine, CA (US)

( * ) Notice: Subject to any disclaimer, the term of this patent is extended or adjusted under 35 U.S.C. 154(b) by 1135 days.

(21) Appl. No.: 11/266,442

(22) Filed: Nov. 3, 2005

(65) Prior Publication Data
US 2007/0115349 A1 May 24, 2007

(51) Int. Cl.
*H04N 7/14* (2006.01)
*G06K 9/40* (2006.01)

(52) U.S. Cl. ............. 348/14.01; 348/14.02; 348/14.08; 348/169

(58) Field of Classification Search ... 348/14.01–14.16, 348/333.03, 345, 208.11, 222.1, 172, 333.12, 348/333.04; 375/240.08, 169; 381/92, 122, 381/113; 382/254, 278
See application file for complete search history.

(56) References Cited

U.S. PATENT DOCUMENTS

| | | | | |
|---|---|---|---|---|
| 2003/0076421 A1* | 4/2003 | Dutta | ............... | 348/208.11 |
| 2003/0161500 A1* | 8/2003 | Blake et al. | ............... | 382/103 |
| 2003/0174773 A1* | 9/2003 | Comaniciu et al. | ............... | 375/240.08 |
| 2004/0174438 A1* | 9/2004 | Jung | ............... | 348/222.1 |
| 2004/0212712 A1* | 10/2004 | Stavely et al. | ............... | 348/333.03 |
| 2006/0012701 A1* | 1/2006 | Hong | ............... | 348/345 |
| 2006/0204019 A1* | 9/2006 | Suzuki et al. | ............... | 381/92 |

FOREIGN PATENT DOCUMENTS

EP 598355 A1 * 5/1994

OTHER PUBLICATIONS

Krombach; method of automatically allocating a video conference participant voice signal to his image; Nov. 20, 1997; WO97/43857.*

* cited by examiner

*Primary Examiner*—Melur Ramakrishnaiah
(74) *Attorney, Agent, or Firm*—McAndrews, Held & Malloy, Ltd.

(57) ABSTRACT

Herein described is a system and method that tracks the face of a person engaged in a videophone conversation. In addition to performing facial tracking, the invention provides stabilization of facial images that are transmitted during the videophone conversation. The face is tracked by employing one or more algorithms that correlate videophone captured facial images against a stored facial image. The face may be better identified by way of employing one or more voice recognition algorithms. The one or more voice recognition algorithms may correlate utterances of the person engaged in a conversation to one or more stored utterances. The identified utterances are subsequently mapped to a stored facial image. In a representative embodiment, the system used for performing facial tracking and image stabilization comprises an image sensor, a lens, an actuator, and a controller/processor.

23 Claims, 4 Drawing Sheets

METHOD AND SYSTEM OF TRACKING AND STABILIZING AN IMAGE TRANSMITTED USING VIDEO TELEPHONY

CROSS-REFERENCE TO RELATED APPLICATIONS/INCORPORATION BY REFERENCE

This application is related to and/or makes reference to U.S. application Ser. No. 11/266,448, filed on Nov. 3, 2005, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

As a result of advances in technology, cellular videophones may be used to enhance a phone conversation between two parties. During the conversation, the persons speaking may transmit their headshots as a way to enhance communication between the two parties. In a conversation, however, the relative movement between the lens of a cellular video phone and its user's head may result in one or more erratic movements or a displacement of the headshot image transmitted to the other party. This movement or displacement may occur because of the natural motion of the hand when operating a cellular videophone, for example. In other instances, this movement may be more pronounced when a party in the conversation is inside a moving vehicle such as an automobile, for example. Vehicular bumps and vibrations may contribute to erratic movement, motion, and/or displacement of the transmitted headshot. A party that receives a headshot, which suffers such erratic movement, motion, and/or displacement, may be unable to recognize the person corresponding to the headshot.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide at least a system and a method that tracks and stabilizes an image of a person being transmitted from a first videophone to a second videophone during a telephone conversation. The various aspects of the invention are substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Various aspects of the invention provide at least a system and a method that tracks and stabilizes an image of a person being transmitted from a first videophone to a second videophone during a telephone conversation. Facial expressions and lip movements of a speaker are transmitted between persons involved in a duplex video telephone conversation. When a transmitting videophone is subjected to movement as facial video is captured, the receiving videophone will display a jittery or blurry facial image. The facial expressions and lip movements of a speaker are better recognized by way of using the one or more tracking and stabilizing systems and methods provided in accordance with the various aspects of the invention. The one or more tracking and stabilizing systems attenuate or eliminate such a jittery or blurry video image. In a preferred representative embodiment, the first and second videophones may comprise wireless or cellular capable videophones. When a facial image or headshot is captured by the first videophone and sent to the second videophone, the various aspects of the invention minimize blurring that occurs due to movement of a videophone relative to the facial image being captured by the videophone. Various aspects of the invention provide a tracking and stabilization system and method that processes captured video of a face or head such that blurriness or shakiness associated with the movement is reduced or eliminated. The processed video is subsequently presented to a user of a videophone.

Figure 1:
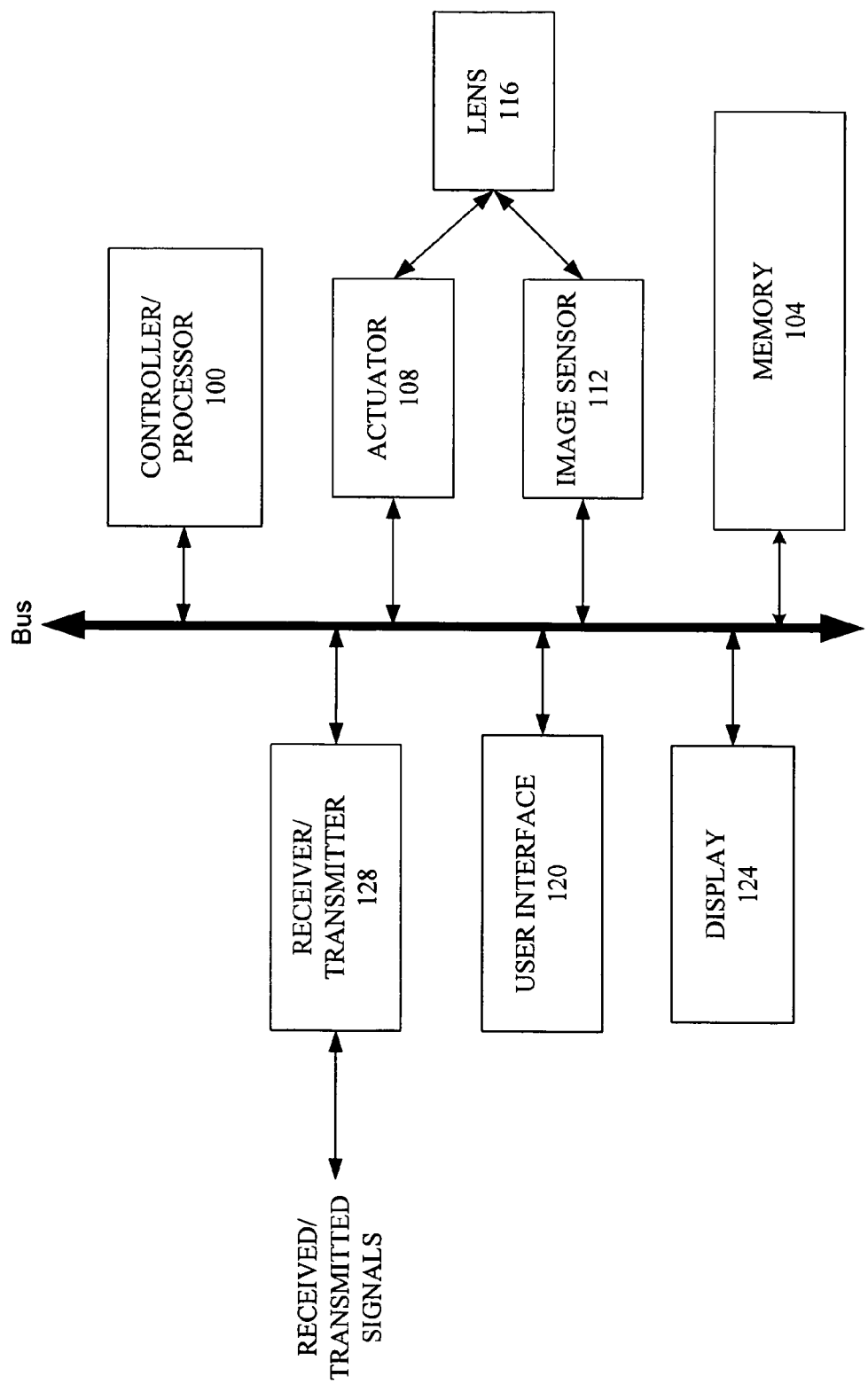
FIG. 1 is a block diagram illustrating a tracking and stabilization system (TSS) used to track and stabilize images taken using a videophone, in accordance with an embodiment of the invention.

FIG. 1 is a block diagram illustrating a tracking and stabilization system (TSS) used to track and stabilize video taken using a videophone, in accordance with an embodiment of the invention. The video may comprise one or more frames of live streaming video data (which may comprise compressed data) transmitted from a first videophone to a second videophone during a video telephony conversation. In a representative embodiment, the TSS tracks and stabilizes video of a person's head or face. The TSS may be resident within any type of videophone. In a preferred representative embodiment, the TSS is implemented and employed within a wireless videophone or cellular videophone. The TSS comprises a controller/processor 100, a memory 104, an actuator 108, an image sensor 112, a lens 116, a user interface 120, a display 124, and a receiver/transmitter 128. Also shown FIG. 1 is a bus used for providing a common electrical communication path between the components 100, 104, 108, 112, 120, 124, 128 of the TSS. The controller/processor 100 may comprise processing hardware that is used to control the memory 104, the actuator 108, the image sensor 112, and the receiver/transmitter 128. The controller/processor 100 may be capable of fetching and decoding one or more instructions from memory 104 such that the components 100, 104, 108, 112, 116, 120, 124, 128 within the TSS may be appropriately controlled. The controller/processor 100 may comprise a central processing unit or CPU. The controller/processor 100 may comprise additional processing circuitry such as a hardware accelerator, for example. The controller/processor 100 interfaces with the user interface 120, and the display 124 by way of the bus, as shown. The user interface 120 may generate signals to the controller/processor 100 based on one or more inputs provided by a user. The user interface 120 may be used to input one or more commands into the controller/processor 100. For example, a person who wishes to engage in a conversation with another party may use the user interface 120 to enable and operate the TSS. For example, the user interface 120 may comprise any touch key or voice operable interface used by the TSS. In other representative embodiments, the user interface 120 may comprise any type of sensory input device. The display 124 provides a visual image of the video received by the receiver/transmitter 128. The receiver/transmitter 128 is used to receive and transmit compressed video signals between videophones. The video signals may be transmitted by another videophone, for example. The display 124 may also be used to provide a visual image of the person speaking into the videophone. In a representative embodiment, the visual image may be displayed by way of placing a picture within a picture (PIP). The memory 104 may be used to store software and/or firmware used by the controller/processor 100. The controller/processor 100 may be used to execute the software such that the various aspects of the invention are implemented. The software and/or firmware may be used to operate the actuator 108 and the lens 116 such that the image sensor 112 properly captures a person's face or headshot. The lens 116 is used to properly direct a visual image of the person's face to the image sensor 112. The lens 116 may be suspended or positioned on a platform or assembly that allows it to rotate around one or more axes. Although not shown in FIG. 1, in one embodiment, it is contemplated that more than one lens assembly (i.e., each lens assembly comprising a lens, image sensor, and actuator) may be used in the TSS. One or more lens assemblies may be positioned in one or more locations around the videophone. When multiple lens assemblies are used, the lens assembly providing the best image (i.e., the lens assembly that provides the best image of the face of the speaker) is used by the videophone. The controller/processor 100 of the TSS may automatically execute a software that selects the lens assembly which has the best view of the face of the user or speaker.

As shown, the lens 116 communicates with the actuator 108 and the image sensor 112. The actuator 108 may provide one or more electrical and/or mechanical inputs to the lens 116 such that the lens 116 appropriately rotates and tracks the movement of a person's head. The controller/processor 100 may control the actuator 108 when the controller/processor 100 executes the software and/or firmware. The controller/processor 100 may provide the necessary electrical signals to control the actuator 108, such that the lens 116 properly tracks a person's head, for example. The image sensor 112 may comprise a charge-coupled device (CCD) used for capturing the facial image provided by the lens 116. One or more algorithms may be utilized when the software and/or firmware is executed. The one or more algorithms may be used to effectively track a person's head and/or stabilize the captured video frames, such that the video is effectively transmitted to a user of another videophone. The received video is provided to the user such that any blurriness or shakiness is reduced or is not perceived by the user. One or more image tracking algorithms may be implemented by way of executing the software and/or firmware such that a face of a speaker may be tracked when a videophone is used. In a representative embodiment, image recognition and detection technologies may be employed to direct the lens 116 to the center of the face being captured. The image sensor 112 captures and then subsequently stores an image of the face into the memory 104. Thereafter, software and/or firmware (i.e., facial recognition and tracking software) are executed such that the facial image is correlated against a database of other images stored in the memory 104. A computation, that measures the degree of correlation between the facial image and the one or more images stored in the database, may determine which image from the database will be used by the one or more image tracking algorithms during the conversation. The controller/processor 100 controls the actuator 108 such that the lens 116 continuously tracks the face of the speaker using the image selected from the database. An image tracking algorithm may continuously correlate the face of the speaker to the image that was selected from the database. In a representative embodiment, the output of the correlation may be used as a feedback signal to reposition the lens of the videophone such that the face of the speaker is continuously tracked. Additionally, the one or more image tracking algorithms may perform an adaptive cropping of the captured facial image such that the image is tracked and positioned into the middle of a display screen. When adaptive cropping is performed, an image that is larger than what is viewed on the display screen is captured, such that any movement of the videophone relative to the user's head is compensated by electronically panning to the appropriate image area on the captured image. An appropriately sized image window, that is smaller than the size of the captured image, may be used to perform the adaptive cropping. The output of the correlation may be used as in input signal to electronically pan the appropriate area in captured image. In a representative embodiment, the tracking occurs such that a captured facial image is centered in the middle of the display 124. In a representative embodiment, the software and/or firmware may employ one or more object segmentation techniques for use in tracking the face of the speaker. By way of using the one or more video object segmentation techniques, one or more objects may be isolated and utilized by the TSS. The TSS may track any one or more of these objects by using the correlation technique previously described, for example.

To supplement the one or more image tracking algorithms previously described, one or more voice recognition algorithms may be used. The one or more voice recognition algorithms may comprise an adaptive array processing technology. The one or more voice recognition or audio recognition algorithms may be used in combination with the one or more image tracking algorithms previously described. The voice recognition algorithm may be used to identify a speaker by correlating an utterance to a database of facial images by way of analyzing the utterance's associated phonic characteristics. The utterance is mapped or associated with one or more appropriate facial images (i.e., facial images of the person speaking). Therefore, the voice recognition technology may be used to better identify the speaker, before he is tracked by the one or more image tracking algorithms. Once the speaker is identified, a preferred set of images or a default image may be used by an image tracking algorithm, for example. One or more users of the videophone may initialize the voice recognition algorithm by storing sample utterances into the memory 104. The stored sample utterances are associated with one or more stored facial images or headshots. The stored facial images may correspond to one or more speakers. The ability of the videophone to track a subject's head may vary based on the displacement of the subject's head relative to the field of view of the lens 116. The ability of the lens 116 to track a subject's head may vary based on the rate of motion of the subject's head relative to the rate in which the lens 116 may be able to track the subject's head. If the videophone is unable to track a person's head, the TSS may automatically replace the output provided by the image sensor 112 with a preferred image. In a representative embodiment, the preferred image may comprise a picture of the speaker immediately before tracking loss occurs. In another representative embodiment, the preferred image may comprise a stored image of the speaker in a most attractive appearance. Yet, in another representative embodiment, the preferred image may comprise an avatar (i.e., an icon or any type of visual representation of the person speaking into the videophone). Details of replacing an actual image with a stored image or an avatar may be found in U.S. application Ser. No. 11/266,448, filed on Nov. 3, 2005, which is hereby incorporated herein by reference in its entirety.

One or more image stabilization algorithms may be used to perform image stabilization by way of executing the software and/or firmware resident within the memory 104. The captured video is stabilized when it is transmitted to a user of another videophone. The captured images may be stabilized using electronic image stabilization (EIS), optical image stabilization (OIS), and/or digital image stabilization (DIS). Electronic image stabilization (EIS) may be used to adjust for any detected shakiness or jittery movement in which its circuitry considers unnatural. For example, any jitter having frequency components above a given lowpass bandwidth may be considered unnatural. EIS may utilize motion sensors to sense the motion of the camera. In a representative embodiment, a spatial-temporal image processing employs a jitter compensation stabilization algorithm. Optical image stabilization (OIS) may be used to stabilize the video being transmitted. OIS may utilize one or more lenses that adjust for any unwanted motion. A lens assembly of an OIS system may be used to compensate for the movement of a videophone relative to a person's head. A videophone that utilizes digital image stabilization (DIS) may employ a built-in gyro-sensor and digital circuitry to detect videophone movement, for example. The TSS may detect movement by comparing a captured video of the facial image, or objects therein, to a smoothed model of the face or objects. The smoothed model may comprise a temporal average of the pixels in one or more frames of the captured facial video.

Figure 2:
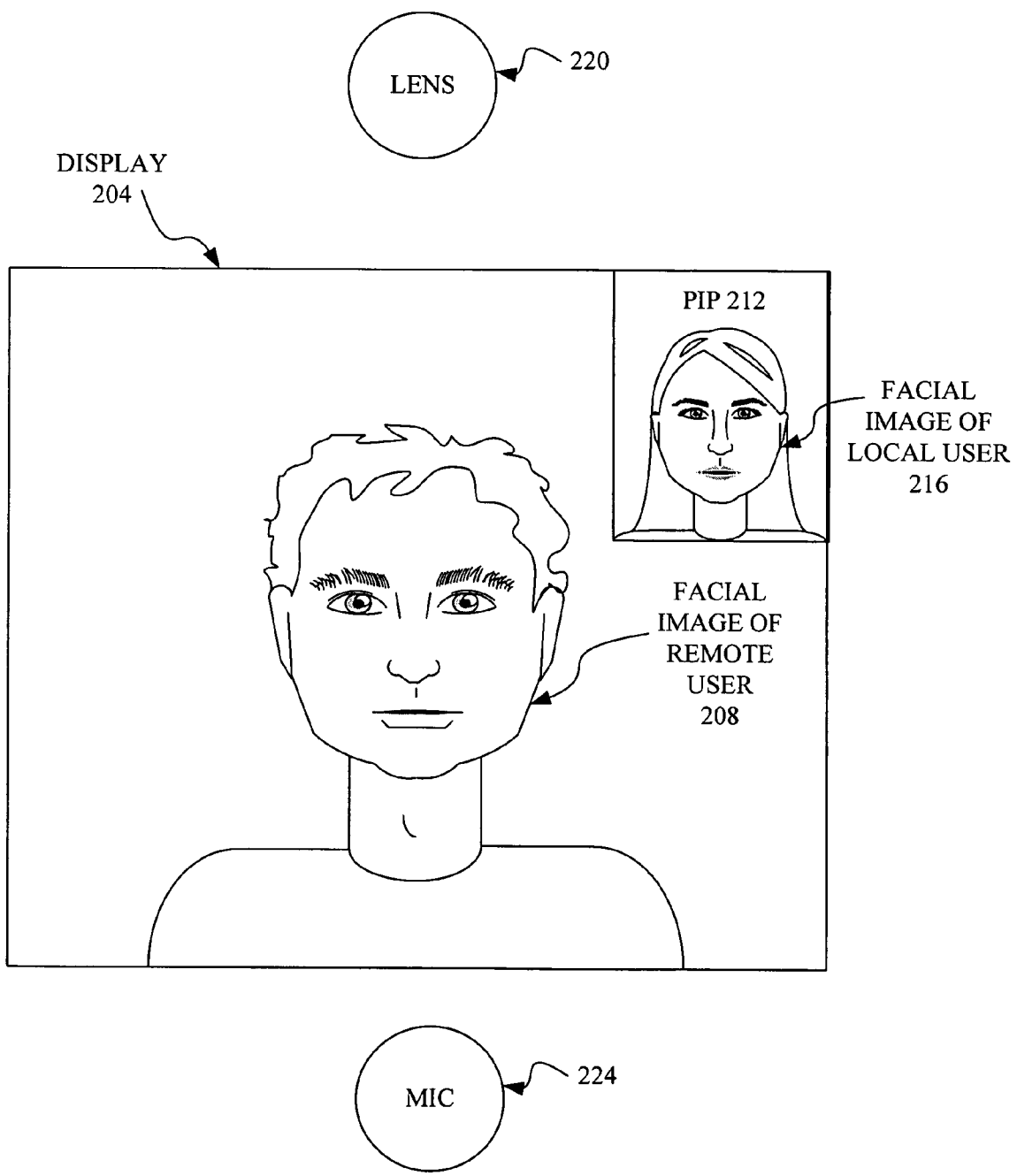
FIG. 2 is a view of a videophone illustrating its display, lens, and microphone, in accordance with an embodiment of the invention.

FIG. 2 is a view of a videophone illustrating a display 204, lens 220, and microphone 224, in accordance with an embodiment of the invention. The display 204 may comprise an LCD color display, for example. The display 204 may be used to view facial images or headshots of a person to whom a speaker is speaking. Additionally, the display 204 provides a secondary image described as a picture-in-picture (PIP) 212 such that the user of the videophone may monitor his outgoing headshot. The display illustrates an exemplary facial image of a remote user 208 and a facial image of a local user 216. In this representative embodiment, the facial image of the local user 216 is provided within the PIP 212. In a representative embodiment, the size of the PIP 212 may be varied by way of inputs provided by the user of the videophone. The lens 220 of the videophone is used to capture the visual images of the local user. The lens 220 of the videophone is used to direct an image to an image sensor. Facial video of the local user may be transmitted as streaming video to another user who is also using a videophone. Furthermore, the image sensor may be used to capture the image and provide a facial display to the local user 216, as shown in FIG. 2. The facial image of the local user may be displayed as a picture-in-picture (PIP) 212. The one or more video tracking algorithms and voice recognition algorithms are used to track the face or head of a speaker such that a facial image or headshot is captured, transmitted, and centered on the display of a videophone. Likewise, the one or more video tracking algorithms, audio recognition algorithms, and/or voice recognition algorithms may be used to center the facial image of the local user 216 within the PIP display area, as shown. As shown in FIG. 2, a microphone 224 is positioned on the videophone to capture the utterances of the local user, while the lens 220 captures the local user's facial expressions. The microphone 224 may comprise any type of sound transducer capable of receiving human utterances. Although it is not illustrated in FIG. 2, it is contemplated that additional lenses may be configured into the videophone when multiple lens assemblies are used, as previously described in reference to FIG. 1.

Figure 3A:
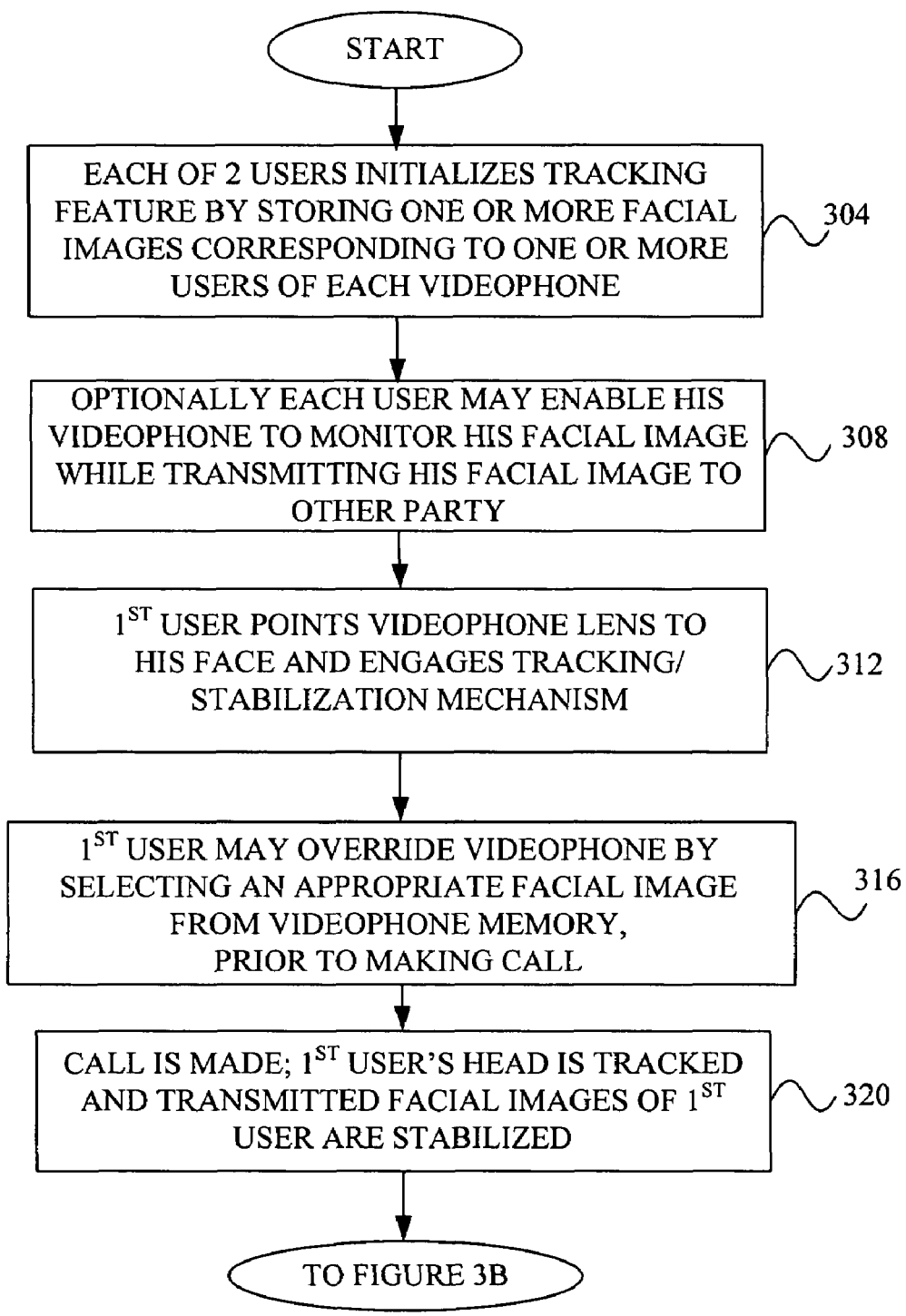
FIGS. 3A and 3B are operational flow diagrams illustrating the use and operation of the tracking and stabilization system (TSS), in accordance with an embodiment of the invention.
Figure 3B:
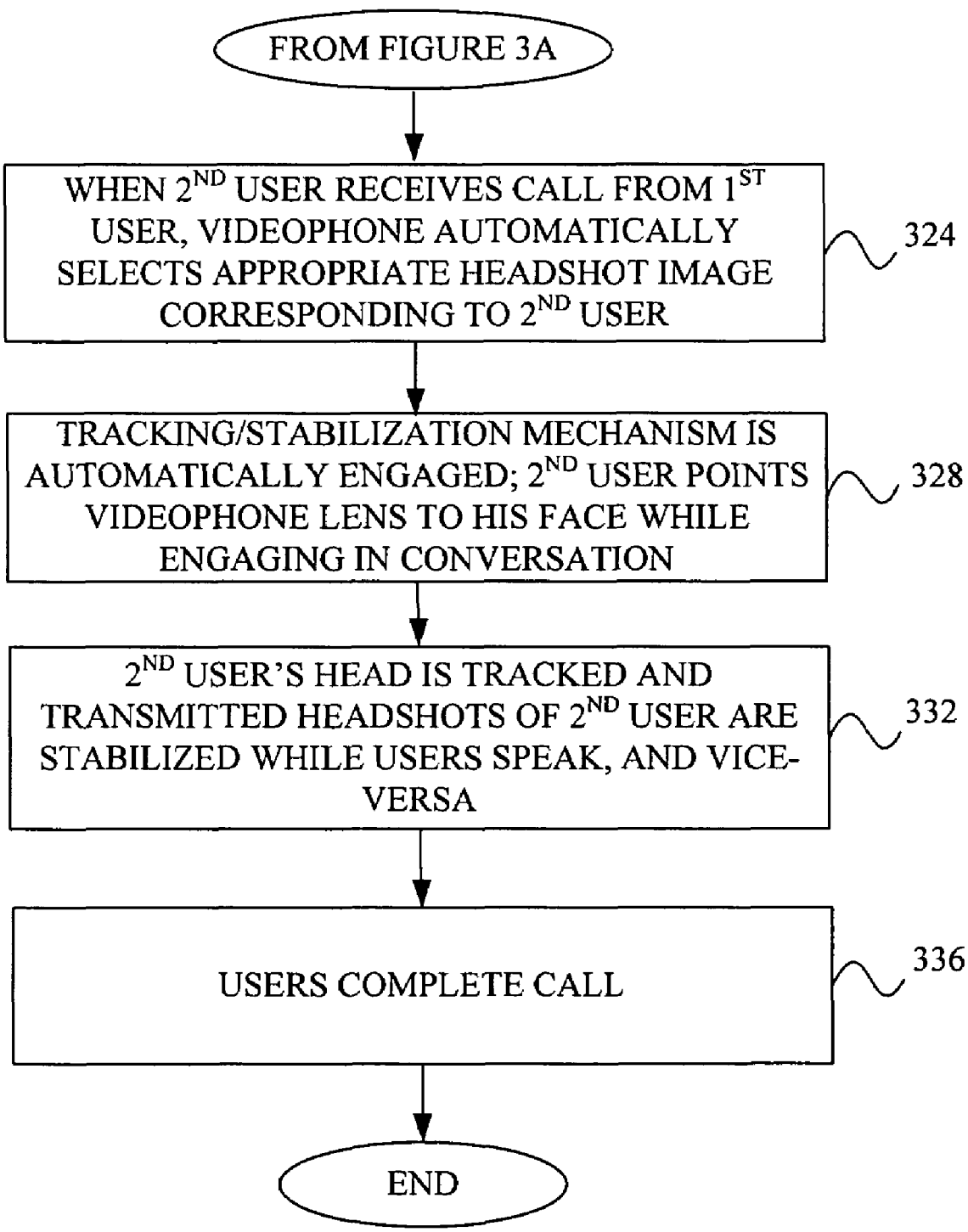

FIGS. 3A and 3B are operational flow diagrams illustrating the use and operation of the tracking and stabilization system (TSS), in accordance with an embodiment of the invention. At step 304, each of two users (using their respective videophones) initializes the one or more tracking algorithms by way of storing one or more facial images corresponding to one or more users of each videophone. This may be performed as an initialization procedure, prior to using each videophone. As technology progresses, this initialization procedure can be expected to become less and less cumbersome, eventually disappearing altogether as the system becomes capable of recognizing the user automatically without using any external input or externally guided training. Next, at step 308, each user may optionally enable his videophone to monitor and locally display his facial headshot, while it is transmitted to the other party. At step 312, a first user points the first videophone lens to his face and subsequently engages the cell phone's tracking/stabilization mechanism. The first user may press a key or button on the videophone's user interface to activate or engage the tracking/stabilization mechanism, for example. The tracking/stabilization mechanism may automatically display the (default) facial image which is used to perform the tracking during the conversation. In a representative embodiment, the first user may initially select a facial image as the default image that is used by the tracking and stabilization system. The facial image that is used by the videophone's tracking system may be displayed as a picture-in-picture (PIP) (as was previously described in FIG. 2) within a videophone's display screen. Thereafter, at step 316, the first user of a first videophone may override the automatic selection provided by the first videophone. To aid the tracking and stabilization system, the first user may select an appropriate facial image stored in memory that most closely resembles him, before initiating a phone call to the second user. The facial image selected may be based on his current facial features and/or the apparel he currently wears. The user may atypically wear spectacles, a hat, a moustache, and/or a beard, for example. At step 320, the first user initiates a phone call to a second user of a second videophone. During the call, the first user's head is tracked using one or more image tracking algorithms. The one or more tracking algorithms may utilize, as a reference, the default facial image stored in the first videophone or an appropriate facial image selected by the first user. The one or more image tracking algorithms are used to direct or reposition the lens of the first videophone to the first user's head in the presence of relative movement between the first user's head and the first videophone. As discussed previously, the one or more image tracking algorithms may perform an adaptive cropping of the captured facial image such that the image is tracked and positioned into the middle of a display screen. The adaptive cropping may be performed in conjunction with or without the lens repositioning method previously discussed. In order to better track the frontal or facial view of the user's head, an adaptive and automatic rotation of the user's head may be accomplished by way of executing a software stored in the memory of the TSS. Furthermore, one or more image stabilization algorithms may be used to stabilize the video images transmitted from the first user to the second user. Proceeding to FIG. 3B, at step 324, a second user of a second videophone receives a call from the first user using the first videophone. The videophone may automatically utilize a particular (i.e., a default) facial image when employing the image tracking mechanism. As previously indicated, the second user of the second videophone may similarly store a number of preferred images into the memory of the second videophone, as an initialization procedure, prior to operating the second videophone. The second user may also designate a particular image as a default image used by a videophone's tracking mechanism. Next, at step 328, the image tracking/stabilization mechanism is automatically engaged and the selected image is used to track the second user's head during the conversation. Similar to the tracking mechanism provided by the first videophone, the one or more image tracking algorithms are used to direct or reposition the lens of the second videophone to the second user's head in the presence of relative movement between the second user's head and the second videophone. Furthermore, one or more image stabilization algorithms may be used to stabilize the video images transmitted to the first user. The second user directs or points the videophone to his face while speaking on the videophone. At step 332, the second videophone tracks the movement of the second user's head while the second user speaks to the first user. Likewise, the first videophone tracks the movement of the first user's head while the first user speaks to the second user. The videophone conversation proceeds until, at step 336, the first and second users end their call and the tracking and stabilization mechanisms are turned off.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of providing video transmission from a first videophone to a second videophone comprising:
    tracking a facial image of a first speaker using said first videophone using one or more image tracking algorithms;
    transmitting a video of said facial image to said second videophone used by a second speaker during conversation between said first speaker and said second speaker; and
    stabilizing the relative movement occurring between adjacent frames of said video of said facial image, wherein said one or more image tracking algorithms is used for:
        first correlating said facial image to a plurality of images stored in a database resident in said first videophone, said first correlating initially performed to select a preferred facial image of said plurality of images, and
        second correlating said facial image to said preferred facial image to generate an output, said output providing a feedback signal to reposition a lens of said videophone such that said facial image is continuously tracked, wherein a microphone of said first videophone is used for receiving utterances of said first speaker of said first videophone and third correlating said utterances to said plurality of facial images for supplementing said one or more image tracking algorithms during said first correlating.

2. The method of claim 1 wherein said tracking comprises utilizing video object segmentation.

3. The method of claim 1 wherein said third correlating utilizes voice recognition technology.

4. The method of claim 3 wherein said voice recognition technology comprises adaptive array processing technology.

5. The method of claim 3 wherein utilizing said voice recognition technology comprises:
    analyzing phonic characteristics of said utterances of said first speaker; and
    mapping said utterances to said preferred facial image.

6. The method of claim 1 wherein said tracking is performed by way of control provided by a controller and an actuator, said controller implementing said one or more image tracking algorithms when a software is executed by said controller.

7. The method of claim 1 wherein said tracking is performed by way of adaptive cropping.

8. The method of claim 1 wherein said video of said facial image is displayed to said first speaker by said first videophone, said video displayed by way of a picture-in-picture.

9. The method of claim 1 wherein said stabilizing utilizes electronic image stabilization technology (EIS).

10. The method of claim 1 wherein said stabilizing utilizes digital image stabilization technology (DIS).

11. The method of claim 1 wherein said stabilizing utilizes optical stabilization technology (OIS).

12. The method of claim 1 wherein said first videophone comprises said lens, a circuitry, and a software, and wherein said circuitry is used to execute said software, said software used for at least partially implementing said tracking and/or said stabilizing.

13. The method of claim 1 wherein said first and second videophones comprise wireless or cellular videophones.

14. A method of tracking a face of a first user of a first videophone, said first videophone used in a video telephony conversation between said first user and a second user, said second user using a second videophone, said method comprising:
    storing a plurality of facial images into a database resident in said first videophone;
    positioning said first videophone to capture a facial image of said first user; and
    engaging one or more algorithms to perform said tracking, said one or more algorithms used for:
        first correlating said facial image of said first user to said plurality of facial images, wherein said first correlating is initially performed to select a preferred facial image of said plurality of images, and
        second correlating said facial image to said preferred facial image to generate an output, said output providing a feedback signal to reposition a lens of said videophone such that said facial image of said first user is continuously tracked; and
        third correlating utterances of said first user to said plurality of facial images for supplementing said first correlating.

15. The method of claim 14 further comprising performing adaptive cropping of said facial image of said first user.

16. The method of claim 14 wherein said one or more algorithms utilizes image recognition technology.

17. The method of claim 14 wherein said third correlating uses voice recognition technology, wherein said voice recognition technology analyzes phonic characteristics of said utterances.

18. A videophone comprising:
    an image sensor used for capturing a facial image;
    a lens for directing said facial image from said first speaker to said image sensor;

an actuator used to provide control of said lens;

a controller used to provide control of said actuator, said controller executing a software to provide one or more image tracking algorithms used in tracking said facial image, said one or more image tracking algorithms used for:

first correlating said facial image to a plurality of images stored in a database resident in said videophone, wherein said first correlating is initially performed to select a preferred facial image of said plurality of images, and second correlating said facial image to said preferred facial image to generate an output, said output providing a feedback signal to reposition said lens of said videophone such that said facial image is continuously tracked; and a microphone for receiving utterances of a user of said videophone and third correlating said utterances to said plurality of facial images for supplementing said one or more image tracking algorithms during said first correlating.

19. The videophone of claim 18 wherein said second correlating is used for at least generating one control signal for performing adaptive cropping of said facial image captured by said image sensor.

20. The videophone of claim 18 wherein said controller executes a software to provide one or more image stabilization algorithms used for stabilizing video images captured by said image sensor.

21. The videophone of claim 18 wherein said controller executes a software to implement one or more voice recognition algorithms used for said third correlating.

22. The videophone of claim 21 wherein said one or more voice recognition algorithms utilizes adaptive array processing technology.

23. The videophone of claim 18 wherein said videophone comprises a mobile phone.

* * * * *